United States Patent
Kudo et al.

(10) Patent No.: US 10,320,005 B2
(45) Date of Patent: Jun. 11, 2019

(54) BISMUTH-VANADATE-LAMINATE MANUFACTURING METHOD AND BISMUTH-VANADATE LAMINATE

(71) Applicants: TOKYO UNIVERSITY OF SCIENCE FOUNDATION, Shinjuku-ku, Tokyo (JP); MITSUI CHEMICALS, INC., Minato-ku, Tokyo (JP); JAPAN TECHNOLOGICAL RESEARCH ASSOCIATION OF ARTIFICIAL PHOTOSYNTHETIC CHEMICAL PROCESS, Chiyoda-ku, Tokyo (JP)

(72) Inventors: Akihiko Kudo, Tokyo (JP); Qingxin Jia, Tokyo (JP); Akihide Iwase, Tokyo (JP)

(73) Assignees: TOKYO UNIVERSITY OF SCIENCE FOUNDATION, Tokyo (JP); MITSUI CHEMICALS, INC., Tokyo (JP); JAPAN TECHNOLOGICAL RESEARCH ASSOCIATION OF ARTIFICIAL PHOTOSYNTHETIC CHEMICAL PROCESS, Tokyo (JP)

( * ) Notice: Subject to any disclaimer, the term of this patent is extended or adjusted under 35 U.S.C. 154(b) by 309 days.

(21) Appl. No.: 14/772,643

(22) PCT Filed: Mar. 4, 2014

(86) PCT No.: PCT/JP2014/055490
§ 371 (c)(1),
(2) Date: Sep. 3, 2015

(87) PCT Pub. No.: WO2014/136783
PCT Pub. Date: Sep. 12, 2014

(65) Prior Publication Data
US 2016/0028092 A1 Jan. 28, 2016

(30) Foreign Application Priority Data
Mar. 7, 2013 (JP) ................................. 2013-045959

(51) Int. Cl.
*H05B 6/64* (2006.01)
*H01M 4/90* (2006.01)
(Continued)

(52) U.S. Cl.
CPC ........... *H01M 4/9016* (2013.01); *B01J 23/14* (2013.01); *B01J 23/22* (2013.01); *B01J 27/135* (2013.01);
(Continued)

(58) Field of Classification Search
CPC ........................ C23C 18/1212; C23C 18/1216; C23C 18/14; B01J 23/16; B01J 23/22;
(Continued)

(56) References Cited

U.S. PATENT DOCUMENTS 5,382,446 A * 1/1995 Smith, Jr. ......... G02F 1/133719
427/126.3
2005/0013934 A1 1/2005 Xiong et al.
(Continued)

FOREIGN PATENT DOCUMENTS

CN 102489324 A 6/2012
CN 202558672 U 11/2012
(Continued)

OTHER PUBLICATIONS

Richard Pearl; Gems Minerals Crystals and Ores, The Collector's Encyclopedia; Golden Press; New York; 1964 (no month); excerpt pp. 78-79, 82-85, 134-135, 144-145, 216-217, 232-235 & 240-241.*
(Continued)

*Primary Examiner* — Marianne L Padgett
(74) *Attorney, Agent, or Firm* — Cantor Colburn LLP

(57) ABSTRACT

A new $BiVO_4$-laminate manufacturing method and $BiVO_4$ laminate are provided. A bismuth-vanadate laminate is manufactured as follows: a substrate that can be heated by microwaves is disposed inside a precursor solution containing a vanadium salt and a bismuth salt, microwave-activated chemical bath deposition (MW-CBD) is used to form a bismuth-vanadate layer on the substrate, and a firing process is performed as necessary. A bismuth-vanadate laminate manufactured in this way is suitable for use as a photocatalyst or photoelectrode.

7 Claims, 18 Drawing Sheets

(51) Int. Cl.
| | |
|---|---|
| C23C 18/12 | (2006.01) |
| C23C 18/14 | (2006.01) |
| B01J 23/22 | (2006.01) |
| B01J 37/34 | (2006.01) |
| B01J 23/14 | (2006.01) |
| B01J 35/00 | (2006.01) |
| C25B 11/04 | (2006.01) |
| H01M 4/88 | (2006.01) |
| B01J 27/135 | (2006.01) |

(52) U.S. Cl.
CPC .......... *B01J 35/002* (2013.01); *B01J 35/004* (2013.01); *B01J 37/346* (2013.01); *C23C 18/1216* (2013.01); *C23C 18/14* (2013.01); *C25B 11/0478* (2013.01); *H01M 4/8842* (2013.01)

(58) Field of Classification Search
CPC ........ B01J 35/002; B01J 35/004; B01J 35/02; B01J 35/023; B01J 35/10; B01J 37/346; H01M 4/8842; H01M 4/9016
USPC .... 502/5, 353; 427/543, 553, 557, 581, 591, 427/595
See application file for complete search history.

(56) References Cited

U.S. PATENT DOCUMENTS

| | | | |
|---|---|---|---|
| 2014/0295178 A1* | 10/2014 | Watanabe | B01J 23/22 428/338 |
| 2017/0183787 A1* | 6/2017 | Katayama | C25B 11/0405 |

FOREIGN PATENT DOCUMENTS

| | | | | |
|---|---|---|---|---|
| JP | 2004024936 A | 1/2004 | | |
| JP | 2004155876 A | 6/2004 | | |
| JP | 2006527779 A | 12/2006 | | |
| JP | 2008019156 A | 1/2008 | | |
| JP | 2008024578 A | 2/2008 | | |
| WO | WO-2013031767 A1 * | 3/2013 | | B01J 23/22 |

OTHER PUBLICATIONS

S.Tokunaga et al.; "Selected Preparation of Monoclinic and Tetragonal BiVO4 with Scheelite Structure and Their Photocatalytic Properties"; Chem. Mater. vol. 13, No. 12; 2001 (published on Web Nov. 30, 2001); pp. 4624-4628.*
Li Zhang et al.; "Monoclinic Structured BiVO4 Nano sheets: Hydrothermal Preparation, Formation Mechanism, and Coloristic and Photocatalytic Properties"; Journal of Physical Chemistry B, vol. 110, No. 6; 2006 (published on web Jan. 26, 2006); pp. 2668-2673.*
Zhenfeng Zhuet al.; "An EDTA-assisted hydrothermal synthesis of BiVo4 hollow microspheres and their evolution into nanocages"; Ceramics International; vol. 38, 2012 (available online Mar. 20, 2012); pp. 4827-4834.*
Jun-Qi Li et al.;"Nanosheet-based BiVO4 hierarchical microspheres and their photocatalytic activity under visible light"; Physica Status Solidi A; vol. 209, No. 2; 2012 (published online Oct. 26, 2011); pp. 248-253.*
Hui Ming Zhang et al.; "Rapid microwave-assisted synthesis of phase controlled BiVO4 nanocrystals and research on photocatalytic properties under visible light irradiation"; Journal nanoparticle research; 2008 (published online Oct. 23, 2007); pp. 767-774.*
Bin Zhou et al.; "Fabrication and photoelectrocatalytic properties of nanocrystalline monoclinic BiVO4 10-film electrode"; Journal of Environmental Sciences; vol. 23, No. 1; 2011 (no month); pp. 151-159.*
Weidong Shi et al.; Microwave-assisted synthesis of nano-scale BiVO4 photocatalyst and their excellent visible-light-driven photocatalytic activity for the degradation of ciprofloxacin; Chemical Engineering Journal, 215-216; 2013 (available online Nov. 21, 2012); pp. 740-746.*
Zhenfeng Zhu et al.; "Synthesis and photocatalytic behavior of BiVO4 with decahedral structure"; Ceramics International, vol. 39; 2013 (available online Mar. 7, 2013); pp. 7461-7465.*
Webster's Ninth New Collegiate Dictionary; Merriam-Webster Inc., Publishers; Springfield, Massachusetts, USA; 1990 (no month); excerpt p. 671.*
Richard J Lewis, Sr.; Hawley's Condensed Chemical Dictionary, 12th edition; Van Nostrand Reinhold company, New York; 1993 (no month); excerpts pp. 246, 249, 1203-1204.*
English abstract of CN 102249305 A; by Shasha Wei et al.; published Nov. 23, 2011.*
English abstract of CN 102557133 A; by Shasha Wei.*
English abstract of CN 102936042 A; by G Tan et al. (Derwent-acc.*
English abstract of CN 102936042 A; by L. Cao et al.; published Mar. 6, 2013 (Derwent-acc-No. 2013-J44887).*
G.Tan et al.; "Effects of pH on the Hierarchal Structures and Photocatalytic Performance of BiVO4 Powders Prepared Via Microwave Hydrothermal Method"; ACS Applied Materials & Interfaces; 2013, vol. 5; pp. 5186-5193 (published May 13, 2013).*
English abstract of CN 102180584 A, by Ruiming Yin et al., published Sep. 14, 2011.*
Extended European Search Report corresponding to European Patent Application No. 14761139.6-1370/2966042 PCT/JP2014/055490; dated Nov. 29, 2016.
Qingxin Jia et al., "Development of a BiVO4 thin film electrode for highly efficient solar splitting of water", University of Tokyo of Science: Research Institute for Science & Technology, Tokyo University of Science Photocatalyst, Dai 110 Kai Shokubai Toronkai toronkai A Yokoshu, Sep. 14, 2012(Sep. 14, 2012), pp. 129 to 130.
International Search Report corresponding to Application No. PCT/JP2014/055490; dated Jun. 10, 2014, with English translation.

* cited by examiner

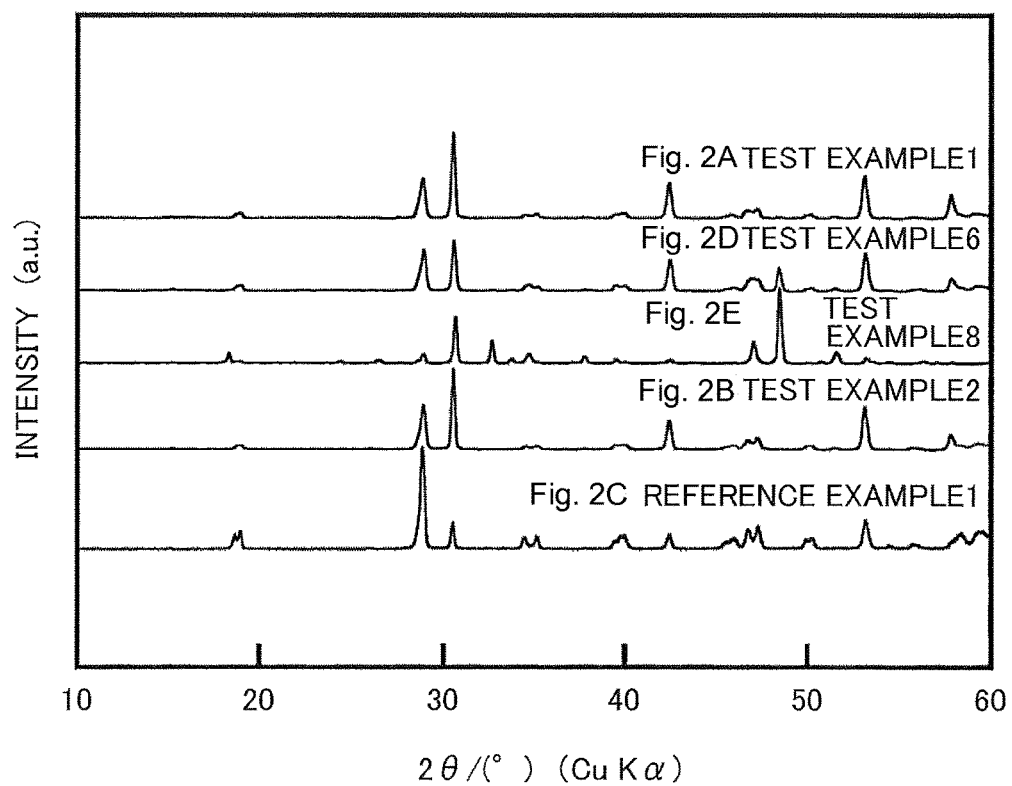

BISMUTH-VANADATE-LAMINATE MANUFACTURING METHOD AND BISMUTH-VANADATE LAMINATE

CROSS REFERENCE TO RELATED APPLICATIONS

This is the U.S. national stage of application No. PCT/JP2014/055490 filed on Mar. 4, 2014. Priority under 35 U.S.C. § 119(a) and 35 U.S.C. § 365(b) is claimed from Japanese Application No. 2013-045959, filed Mar. 7, 2013, the disclosure of which is also incorporated herein by reference.

TECHNICAL FIELD

The present invention relates to a bismuth-vanadate-laminate manufacturing method and a bismuth-vanadate laminate.

BACKGROUND ART

From the perspective of energy and environmental concerns, technologies that convert solar energy into hydrogen energy by the electrolysis of water using a photocatalyst have attracted attention. 1.23 V or more of an electrolytic voltage is theoretically required in a reaction of the electrolysis of water. Therefore, it is desirable to create a photoelectrode to enable the electrolysis of water with a low voltage. Typically, in producing the photoelectrode, a method of coating a substrate or the like with a photocatalyst is employed. Micronization of the photocatalyst has been studied to obtain a homogeneous thin film of the photocatalyst.

Micronization of $BiVO_4$ has been studied in bismuth vanadate ($BiVO_4$), which is known to have a photocatalytic activity. For example, a method of irradiating a suspension with laser light under agitation, the suspension being obtained so that $BiVO_4$ powder having an average particle diameter of about 10 to 20 μm is dispersed in an aqueous medium, to obtain minute particles of $BiVO_4$ having an average particle diameter of 1 μm or less, to manufacture a colloidal dispersion, has been proposed (see Patent Document 1). Furthermore, a method of manufacturing fine $BiVO_4$ powder having a BET surface area of about 0.3 $m^2$ $g^{-1}$ by making $NH_4VO_3$ and $Bi(NO_3)_3$ to react with each other under the presence of urea has been proposed (see Patent Document 2).

Patent Document 1: Japanese Unexamined Patent Application, Publication No. 2008-019156
Patent Document 2: Japanese Unexamined Patent Application, Publication No. 2004-024936

DISCLOSURE OF THE INVENTION

Problems to be Solved by the Invention

However, a thin film obtained so that a substrate is coated with such fine $BiVO_4$ powder does not exhibit sufficient performance to be used as the photoelectrode. Therefore, a $BiVO_4$ thin film having higher performance has been desired.

An objective of the present invention is to provide a new method of manufacturing a $BiVO_4$ laminate and a $BiVO_4$ laminate.

Means for Solving the Problems

The present inventors have found that when a substrate that can be heated with microwaves is arranged in a precursor solution that contains a vanadium salt and a bismuth salt, a $BiVO_4$ layer is formed by microwave-activated chemical bath deposition (MW-CBD), and a sintering process is performed as necessary, a high-performance $BiVO_4$ layer applicable to a photocatalyst or a photoelectrode can be obtained, and have completed the present invention. That is, the present invention is described as (1) to (9) below.

(1) A bismuth-vanadate-laminate manufacturing method including the step of arranging a substrate heatable with microwaves in a precursor solution containing a vanadium salt and a bismuth salt, and forming a bismuth-vanadate layer on the substrate by microwave-activated chemical bath deposition (MW-CBD).

(2) The bismuth-vanadate-laminate manufacturing method according to the above (1), further including the step of subjecting the bismuth-vanadate layer to a sintering process.

(3) The bismuth-vanadate-laminate manufacturing method according to the above (1) or (2), wherein ratios of a zircon-structure tetragonal phase (z-t phase) and a scheelite-structure monoclinic phase (s-m phase) in a crystal phase of the bismuth-vanadate layer are changed by changing at least one selected from existence/non-existence of addition of urea to the precursor solution, an addition amount of the urea to the precursor solution, an irradiation output, and an irradiation time of the microwaves used in the microwave-activated chemical bath deposition.

(4) The bismuth-vanadate-laminate manufacturing method according to the above (2), wherein ratios of a zircon-structure tetragonal phase (z-t phase) and a scheelite-structure monoclinic phase (s-m phase) in a crystal phase of the bismuth-vanadate layer are changed by changing at least one of a sintering temperature and a sintering time in the sintering process.

(5) The bismuth-vanadate-laminate manufacturing method according to any one of the above (1) to (4), wherein an area ratio of a crystal of a scheelite-structure monoclinic phase (s-m phase) occupied in the substrate is 60 to 100% in plan view of the bismuth-vanadate layer.

(6) The bismuth-vanadate-laminate manufacturing method according to the above (1), including the steps of:
forming a first bismuth-vanadate layer on the substrate using microwave-activated chemical bath deposition; and
forming a second bismuth-vanadate layer on the first bismuth-vanadate layer by coating and sintering a precursor coating a solution containing a vanadium salt and a bismuth salt on the first bismuth-vanadate layer.

(7) The bismuth-vanadate-laminate manufacturing method according to the above (6), wherein a crystal phase of the first bismuth-vanadate layer is a zircon-structure tetragonal phase (z-t phase), and a crystal phase of the second bismuth-vanadate layer is a scheelite-structure monoclinic phase (s-m phase).

(8) A bismuth-vanadate laminate manufactured by the bismuth-vanadate-laminate manufacturing method according to any one of the above (1) to (7).

(9) A bismuth-vanadate laminate including: a fluorine-doped tin oxide film on a transparent substrate; and a bismuth-vanadate layer on the fluorine-doped tin oxide film, wherein a peak value of a diffraction line measured near $2\theta=31°$ is larger than a peak value of a diffraction line measured near $2\theta=28°$, in an X-ray diffraction pattern of the bismuth-vanadate layer.

Note that, in the present invention, the "near" means±0.5°.

Effects of the Invention

According to the present invention, a new method of manufacturing a $BiVO_4$ laminate and a $BiVO_4$ laminate can be provided.

BRIEF DESCRIPTION OF THE DRAWINGS

FIG. 2 is a diagram illustrating X-ray diffraction patterns of $BiVO_4$ layers formed in Test Examples 1, 2, 6, and 8, and Reference Example 1.

PREFERRED MODE FOR CARRYING OUT THE INVENTION

Figure 1A:
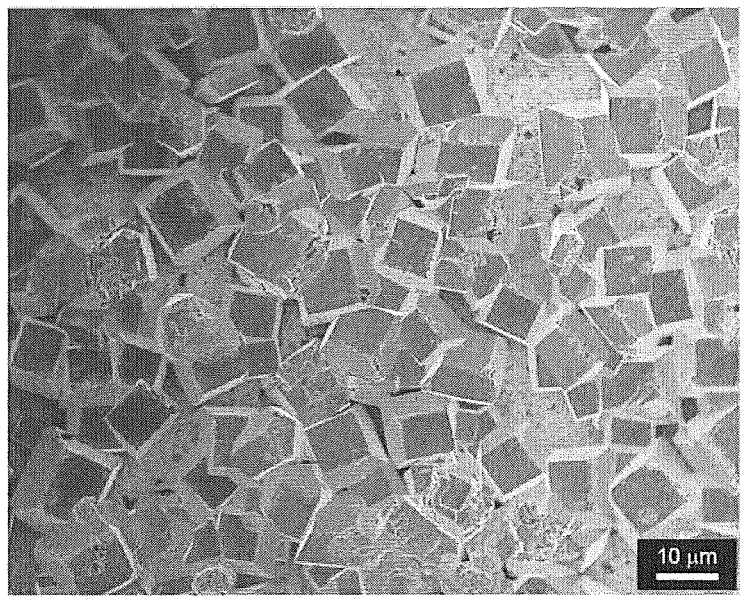
FIGS. 1A and 1B are diagrams illustrating a scanning electron microscope (SEM) observation image of a $BiVO_4$ layer formed in Test Example 1.

Hereinafter, embodiments of the present invention will be described in detail. However, the present invention is not limited by the embodiments below, and can be carried out by the addition of appropriate changes within the objective of the present invention.

A bismuth-vanadate-laminate manufacturing method of the present invention includes a step of arranging a substrate that can be heated with microwaves in a precursor solution that contains a vanadium salt and a bismuth salt, and forming a bismuth-vanadate layer on the substrate by microwave-activated chemical bath deposition (MW-CBD).

The precursor solution used in the present invention is a solvent in which the vanadium salt and the bismuth salt are dissolved.

Examples of the vanadium salt include vanadium chloride, ammonium metavanadate, vanadium oxytrichloride, vanadium oxysulfate, and vanadium pentoxide, and among them, ammonium metavanadate is favorable.

Examples of the bismuth salt include bismuth nitrate, bismuth chloride, bismuth trioxide, bismuth oxycarbonate, bismuth oxychloride, and bismuth hydroxide, and among them, bismuth nitrate is favorable.

In the precursor solution, the concentration of the vanadium salt is favorably 0.01 to 0.4 mol/l, and more favorably 0.05 to 0.2 mol/l. Furthermore, the concentration of the bismuth salt is favorably 0.01 to 0.4 mol/l, and more favorably 0.05 to 0.2 mol/l. Amounts of vanadium to bismuth and the precursor solution favorably satisfies V/Bi=0.9 to 1.5 (mol/mol), and more favorably equivalent.

The precursor solution may contain urea. An addition amount of urea is favorably 0 to 3000 mol % to the number of moles of the vanadium salt or the bismuth salt.

The solvent used for the precursor solution is not especially limited as long as the solvent can dissolve the vanadium salt and the bismuth salt. However, water is favorable.

The precursor solution may further contain an acid for pH control. Examples of the acid include nitric acid, hydrochloric acid, and sulfuric acid.

Examples of the substrate that can be heated with microwaves used in the present invention include a dielectric and a metal oxide.

When the manufactured $BiVO_4$ laminate is used as a photoelectrode, a substrate including a conductive film is favorably used as the substrate. Examples of the conductive film include thin films of tin-doped indium oxide (ITO), zinc-doped indium oxide (IZO), antimony-doped tin oxide (ATO), fluorine-doped tin-oxide (FTO), and aluminum-doped zinc oxide (AZO). One obtained so that the above-described conductive film is laminated on a glass substrate or a resin substrate is favorably used. Examples of the glass substrate include soda-lime glass, heat-resistant glass, and quartz glass. Examples of the resin substrate include a polyester resin, a diacetate resin, a triacetate resin, an acrylic resin, a polycarbonate resin, a polyarylate resin, a polyvinyl chloride, a polysulfone resin, a polyether sulfone resin, a polyimide resin, a polyamide resin, a polyolefin resin, and a cyclic polyolefin resin. Among them, an FTO glass substrate is favorably used because the crystal plane of a 010 plane of $BiVO_4$, which serves as a reduction site, can be easily oriented when a reaction using $BiVO_4$ as a photocatalyst is conducted.

When a substrate without including the conductive film is used as the substrate, the manufactured $BiVO_4$ laminate can be used as a photocatalyst in various reactions.

The microwave-activated chemical bath deposition (MW-CBD) performed in the present invention is a method of forming a solid phase, associated with nucleation of a specified substance and particle growth, by irradiating the precursor solution in which the substrate is placed with the microwaves. A commercially available microwave synthesis reactor may be used to irradiate the precursor solution with the microwaves.

The output of the irradiated microwaves is favorably 50 to 1500 W, and more favorably 100 to 500 W. Furthermore, the irradiation time of the microwaves is favorably 0.5 to 60 minutes, and more favorably 1 to 30 minutes.

The method of manufacturing a $BiVO_4$ laminate of the present invention may further include a step of subjecting a formed $BiVO_4$ layer to a sintering process. The atmosphere in the sintering process is not especially limited, and oxygen gas, an inert gas such as a nitrogen gas, or an arbitrary mixed gas of oxygen and an inert gas can be used. Air (an oxygen-containing gas) can be exemplified as such a mixed gas. When the sintering process is performed, the process is favorably performed at 100 to 550° C. for 0.5 to 5 hours.

In the method of manufacturing a $BiVO_4$ laminate of the present invention, the $BiVO_4$ layer grows on a surface of the substrate as follows. That is, when a substrate that can be heated with microwaves arranged in the precursor solution is irradiated with the microwaves, the substrate is heated, and a core of $BiVO_4$ is created on the surface. First, a crystal of a z-t phase of $BiVO_4$ grows from the core of the $BiVO_4$. When the substrate is irradiated with the microwaves for a long time, the crystal is changed from the z-t phase to a thermodynamically stable s-m phase, and the crystal of the s-m phase grows further.

Therefore, if an irradiation output of the microwaves is large, or if an irradiation time of the microwaves is long, a ratio of the s-m phase on the crystal phase of the $BiVO_4$ layer formed on the substrate can be increased. Furthermore, the crystal of the s-m layer can grow large.

When urea is added to the precursor solution, the precursor solution is heated by irradiation of the microwaves. Then, hydrolysis of urea is caused, and a core of $BiVO_4$ is created in the precursor solution due to an increase in pH by the generated ammonia. The core of $BiVO_4$ created in the precursor solution grows in the precursor solution, and powdery $BiVO_4$ having low crystallinity is more likely to be created. As described above, if urea is added, energy provided by the microwaves is used in formation of the powdery $BiVO_4$. Therefore, energy that can be used for changing the crystal of the z-t phase into the crystal of the s-m phase, or for growing the crystal of the s-m phase is decreased in the crystal phase of the $BiVO_4$ layer formed on the substrate, and the ratio of the z-t phase becomes high.

Therefore, the larger the amount of urea added to the precursor solution, the higher the ratio of the z-t phase.

Furthermore, if the sintering process is performed, typically, a process is transferred to a thermodynamically stable state. Therefore, in the sintering process performed after formation of the $BiVO_4$ layer, if the sintering temperature is high, or the sintering time is long, the ratio of the s-m phase can be made higher in the $BiVO_4$ layer. Furthermore, the crystal of the s-m layer can grow large.

Typically, the crystal of the s-m phase has higher photoresponsivity than the crystal of the z-t phase. Therefore, regarding the ratios of the s-m phase and the z-t phase in the $BiVO_4$ layer, the area ratio of the crystal of the s-m phase occupied in the substrate is favorably 60 to 100% in plan view of the $BiVO_4$ layer, and more favorably 80 to 100%.

The ratios of the s-m phase and the z-t phase in the crystal phase of the $BiVO_4$ layer can be observed with an X-ray diffraction pattern, SEM observation, a Raman spectrum, and the like.

In the X-ray diffraction pattern, diffraction lines characteristic of the crystal phase of the s-m phase of $BiVO_4$ are known to be observed near $2\theta=31°$ and near $2\theta=28°$. The diffraction line observed near $2\theta=31°$ corresponds to a 040 plane of the crystal and a 010 phase parallel to the 040 plane. Furthermore, the diffraction line observed near $2\theta=28°$ corresponds to a 121 plane and a −121 plane of the crystal. If a peak of the diffraction line observed near $2\theta=31°$ is large, it can be said that a crystal having a high-orientation 010 plane is formed. Furthermore, diffraction lines characteristic of the crystal phase of the z-t phase of $BiVO_4$ are known to be observed near $2\theta=49°$, near $2\theta=32°$, and near $2\theta=25°$. From magnitude of peak values of these diffraction lines, the ratios of the crystal phases of the s-m phase and the z-t phase formed on the $BiVO_4$ layer and a height of orientation of the s-m phase can be confirmed.

Furthermore, the ratios of the crystal phases of the s-m phase and the z-t phase formed on the $BiVO_4$ layer and the height of the orientation of the s-m phase can be confirmed by using SEM observation and the Raman spectrum. In the Raman spectrum, a peak near 829 $cm^{-1}$ is characteristic of the s-m phase, and a peak near 854 $cm^{-1}$ is characteristic of the z-t phase. Decahedral particles observed in a SEM are the crystal of the s-m phase, and when a square-like plane exists parallel to the substrate, the orientation of the 010 plane is high.

For example, when a $BiVO_4$ laminate is manufactured by the manufacturing method of the present invention using a substrate having an FTO film as a substrate, in the X-ray diffraction pattern, a surface having the peak value of the diffraction line observed near $2\theta=31°$ much larger than the peak value of the diffraction line observed near $2\theta=28°$ can be obtained. Furthermore, when observation with the SEM is further performed, many decahedral particles having the 010 plane arranged parallel to the substrate are observed. As described above, the $BiVO_4$ layer having the s-m phase having the high-orientation 010 phase exhibits high photoresponsivity, and can be used as a photocatalyst or a photoelectrode.

A $BiVO_4$ layer of a $BiVO_4$ laminate formed by a conventional method of coating a substrate with a suspension of $BiVO_4$ fine powder is much different from the $BiVO_4$ layer formed by the manufacturing method of the present invention. In the X-ray diffraction pattern of the $BiVO_4$ layer created by coating the substrate with the suspension of $BiVO_4$ fine powder, the peak value of the diffraction line observed near $2\theta=28°$ is substantially larger than the peak value of the diffraction line observed near $2\theta=31°$, and there is no 010-plane orientation.

Note that the method of manufacturing a $BiVO_4$ laminate of the present invention may further include a step of forming a second $BiVO_4$ layer on a first $BiVO_4$ layer by coating and sintering a precursor coating solution containing a vanadium salt and a bismuth salt on the first $BiVO_4$ layer formed by the microwave-activated chemical bath deposition (MW-CBD). Note that a method of forming a $BiVO_4$ layer by coating and sintering the precursor coating solution containing a vanadium salt and a bismuth salt (hereinafter, this method is called "solution method") has already been reported by the present inventors (Qingxin Jia, Katsuya Iwashina, Akihiko Kudo, Proceedings of the National Academy of Sciences of the United States of America, Vol. 109, No. 29, 11564-11569 (2012)).

When the second $BiVO_4$ layer is further formed on the first $BiVO_4$ formed by the above-described microwave-activated chemical bath deposition using the solution method, first, the precursor coating solution containing a vanadium salt and a bismuth salt is coated on the first $BiVO_4$ layer, and the first $BiVO_4$ layer is dried at a room temperature, so that a coated layer is obtained. Then, the coated layer is sintered so that the second $BiVO_4$ layer can be formed on the first $BiVO_4$ layer.

The precursor coating solution may be similar to the precursor solution used in the microwave-activated chemical bath deposition, or configurations of types or concentration of salts to be used may be changed. In the precursor coating solution, examples of the vanadium salt include vanadium chloride, ammonium metavanadate, vanadium oxytrichloride, vanadium oxytrichloride, and vanadium pentoxide, and among them, ammonium metavanadate is favorable. Furthermore, examples of the bismuth salt include bismuth nitrate, bismuth chloride, bismuth trioxide, bismuth oxycarbonate, bismuth oxychloride, and bismuth hydroxide, and among them, bismuth nitrate is favorably.

In the precursor coating solution, the concentration of the vanadium salt is favorably 0.01 to 0.4 mol/l, and more favorably 0.05 to 0.3 mol/l. Furthermore, the concentration of the bismuth salt is favorably 0.01 to 0.4 mol/l, and more favorably 0.05 to 0.3 mol/l. Amounts of vanadium to bismuth to the precursor coating solution is favorably V/Bi=0.9 to 1.5 (mol/mol), and more favorably equivalent.

The solvent used for the precursor solution is not especially limited as long as the solvent can dissolve the vanadium salt and the bismuth salt. However, water is favorable.

The precursor coating solution may contain another acid for pH control. Examples of the acid include nitric acid, hydrochloric acid, and sulfuric acid.

A method of coating the first $BiVO_4$ layer with the precursor coating solution is not especially limited, and various known method can be used. Examples of the method include a dip method, a spray method, a drop method, a print method, an inkjet method, a nozzle coating method, a slit coating method, a roll coating method, a spin coating method, and a dip coating method. For example, when the first $BiVO_4$ layer is coated by the drop method, the coating amount of the precursor coating solution is favorably 0.5 to 10 µl/cm$^2$, and more favorably 1 to 5 µl/cm$^2$.

An atmosphere when the coated layer is sintered is not especially limited, and an oxygen gas, an inert gas such as a nitrogen gas, or an arbitrary mixed gas of oxygen and an inert gas can be used. Air (an oxygen-containing gas) can be exemplified as such a mixed gas. The sintering temperature is favorably 300 to 550° C., and more favorably 350 to 500° C. Furthermore, the sintering time is favorably 1 to 5 hours, and more favorably 1 to 3 hours. Note that the sintering process to obtain the second $BiVO_4$ layer can also serve as a sintering process to the first $BiVO_4$ layer. Furthermore, after the first $BiVO_4$ layer is subjected to the sintering process, the first $BiVO_4$ layer may be coated with the precursor coating solution.

The crystal phase of the first $BiVO_4$ layer may be the z-t phase, the s-m phase, or both the s-m phase and the z-t phase. However, the crystal phase of the first $BiVO_4$ layer is favorably the z-t phase. Furthermore, the crystal phase of the second $BiVO_4$ layer is favorably the s-m phase. A dense $BiVO_4$ layer with the s-m phase can be easily formed by the solution method, and the photoresponsivity of the $BiVO_4$ laminate can be further improved.

EXAMPLES

Hereinafter, the present invention will be described in detail based on examples and the like. However, the present invention is not limited by these examples and the like at all.

Test Example 1

25 ml of a nitric acid (1 mol/l) solution containing 0.15 mol/l of $NH_4VO_3$ and 25 ml of a nitric acid (1 mol/l) solution containing 0.15 mol/l of $Bi(NO_3)_3 \cdot 5H_2O$ were mixed in a 500 ml volumetric separable flat-bottom flask, and a precursor solution was prepared. One sheet of 5×5 cm FTO glass substrate (A-110U80, 20 Ω/sq AGC, manufactured by Fabritech Co., Ltd) was arranged in a bottom of the flat-bottom flask, with the glass surface downwards. A cooling tube was attached to the separable flat-bottom flask, and the flask was placed in a microwave synthesis device (EYELA MWO-1000). When the flask was irradiated with microwaves having a frequency of 2.45 GHz at 300 W for 10 minutes, a laminate having a $BiVO_4$ layer laminated on an FTO layer was obtained. The laminate was taken out, and washed with pure water and dried.

A result of observation of the laminated $BiVO_4$ layer with a SEM (JEOL, JAM-6700F) is illustrated in FIG. 1A. There are two types of crystals of $BiVO_4$. It was judged that larger crystals in the upper layer are crystals of an s-m phase, and the smaller crystals thereunder are crystals of a z-t phase, from a result of a Raman spectrum. Furthermore, the crystals of the s-m phase exist densely, having a square-like plane parallel to the substrate. From the observation result of the SEM, when an area ratio (s-m phase coverage) of the crystal of the s-m phase occupied on the FTO glass substrate in plan view of the $BiVO_4$ layer was obtained, the area proportion was 90%. Furthermore, an area ratio (z-t phase coverage) of the crystal of the z-t phase occupied on the FTO glass substrate in plan view of the $BiVO_4$ layer was obtained, the area ratio was 1%. The remaining 9% was a portion where the FTO layer is visible.

Figure 1B:
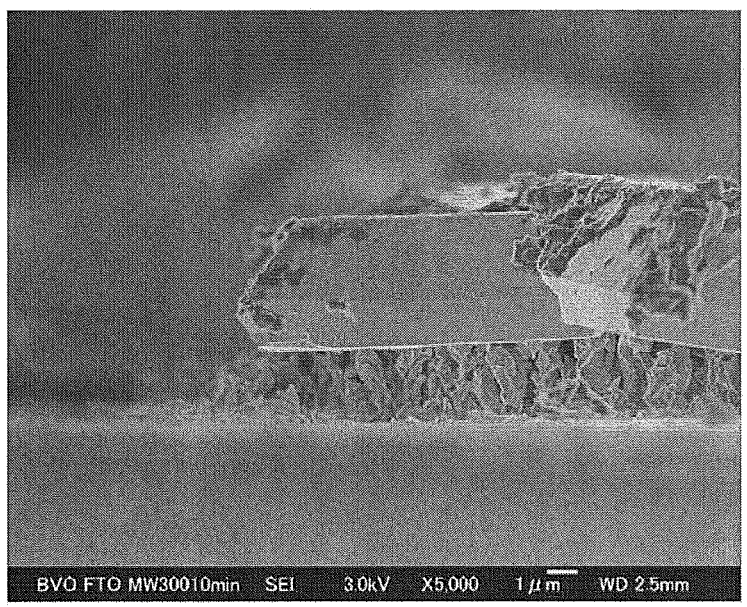

A result of observation of a cross section of the laminate with the SEM is illustrated in FIG. 1B. There is the crystal of the z-t phase of $BiVO_4$ on the FTO layer, and the crystal of the s-m phase exists thereon.

Furthermore, an X-ray diffraction pattern of the $BiVO_4$ layer of this laminate is illustrated in FIG. 2A. Diffraction lines near $2\theta=31°$ characteristic of the s-m phase and near $2\theta=28°$ appeared as large peaks. Especially, the peak value of the diffraction line near $2\theta=31°$ was large. Therefore, it was found that the orientation of a 010 plane is high, and the square-like plane observed with the SEM is the 010 plane.

Test Example 2

Figure 3A:
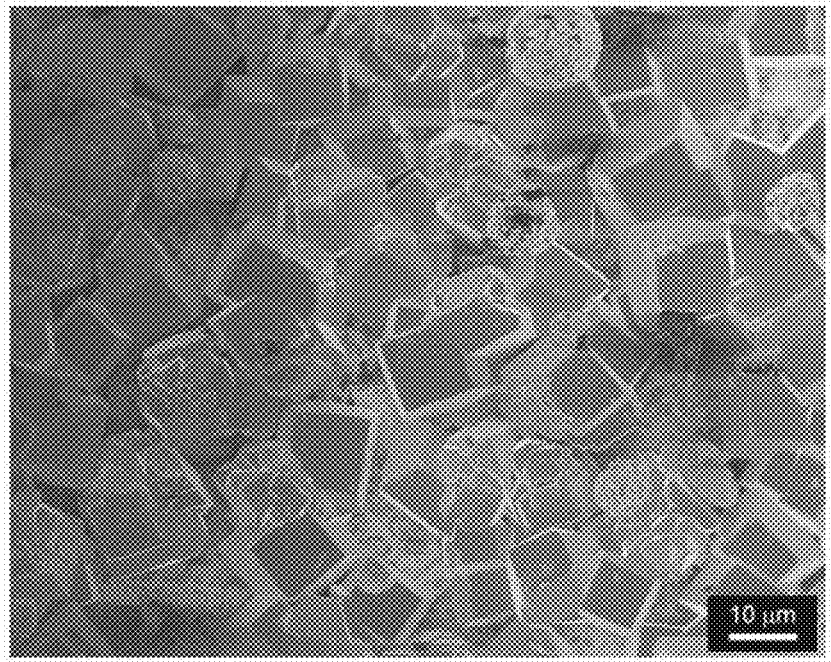
FIG. 3 is a diagram illustrating a SEM observation image of a $BiVO_4$ layer formed in Test Example 2.

A $BiVO_4$ layer was laminated on an FTO glass substrate, similarly to Test Example 1, except that irradiation of microwaves was performed at 300 W for 30 minutes. A result of observation of the obtained $BiVO_4$ layer of the laminate with a SEM is illustrated in FIG. 3A. Crystals of an s-m phase of $BiVO_4$ were observed but a crystal of a z-t phase was not observed. Furthermore, the crystals of the s-m phase existed densely, having a square-like plane parallel to the substrate. When an s-m phase coverage was obtained, similarly to Test Example 1, the coverage was 93%.

Figure 3B:
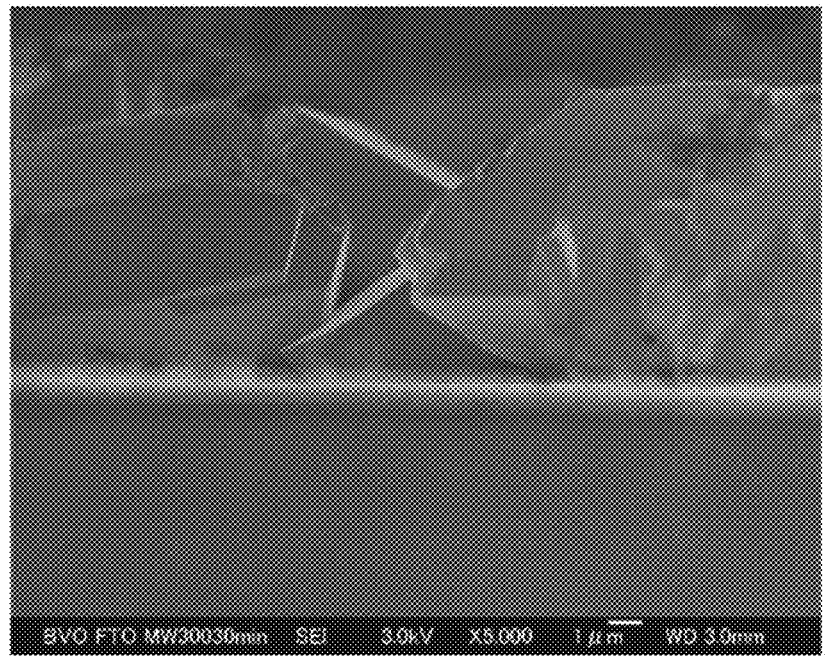

A result of observation of a cross section of the laminate with the SEM is illustrated in FIG. 3B. There was the crystal of the s-m phase of $BiVO_4$ on the FTO layer, no crystal of the z-t phase was observed. As described above, when irradiation time of the microwaves was made longer than in Test Example 1, the ratio of the s-m phase was increased.

The X-ray diffraction pattern of the $BiVO_4$ layer of the laminate is illustrated in FIG. 2B. Diffraction lines near $2\theta=31°$ characteristic of the s-m phase and near $2\theta=28°$ appeared as large peaks, and the large peak value of the diffraction line near $2\theta=31°$ was similar to that of Test Example 1. It was found that orientation of a 010 plane is high.

Reference Example 1

25 ml of a nitric acid (1 mol/l) solution containing 0.15 mol/l of $NH_4VO_3$ and 25 ml of a nitric acid (1 mol/l) solution containing 0.15 mol/l of $Bi(NO_3)_3 \cdot 5H_2O$ were mixed in a flask.

Figure 4:
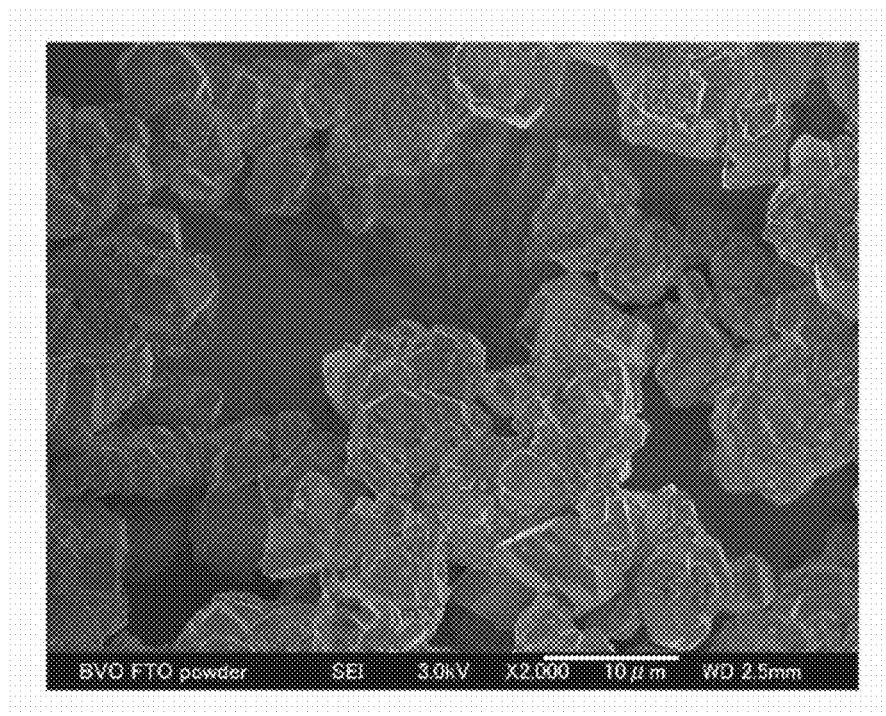
FIG. 4 is a diagram illustrating a SEM observation image of a $BiVO_4$ layer formed in Reference Example 1.

3 g of urea was added and dissolved in the solution. This flask was placed in a microwave synthesis device. When the flask was irradiated with microwaves having a frequency of 2.45 GHz at 500 W for 60 minutes, $BiVO_4$ powder was deposited in the solution. The $BiVO_4$ powder was filtrated, washed with water, and dried. This powder was mixed with dissolved acetylene (solvent:acetone), then water was added, and the mixture was made into paste. An FTO layer of an FTO glass substrate was coated with the paste by a squeegee method, dried, and sintered at 400° C. for 1 hour. The result of observation of a $BiVO_4$-coated surface of the substrate with the SEM is illustrated in FIG. 4. Crystals of $BiVO_4$ randomly existed on the FTO layer. From a result of a Raman spectrum, it was found that these crystals were in the s-m phase.

An X-ray diffraction pattern of the $BiVO_4$-coated surface of the substrate is illustrated in FIG. 2C. Diffraction lines near $2\theta=31°$ characteristic of the s-m phase and near $2\theta=28°$ appeared as large peaks. However, the peak value of the diffraction line near $2\theta=28°$ was substantially larger than the peak value of the diffraction line near $2\theta=31°$, and it was found that there is no orientation of a 010 plane.

Test Example 3

A laminate obtained in Test Example 1 was subjected to a sintering process at 350° C. for 1 hour. Following that, when an s-m phase coverage and a z-t phase coverage were obtained, similarly to Test Example 1, the s-m phase coverage was 90% and the z-t phase coverage was 1%.

Figure 5:
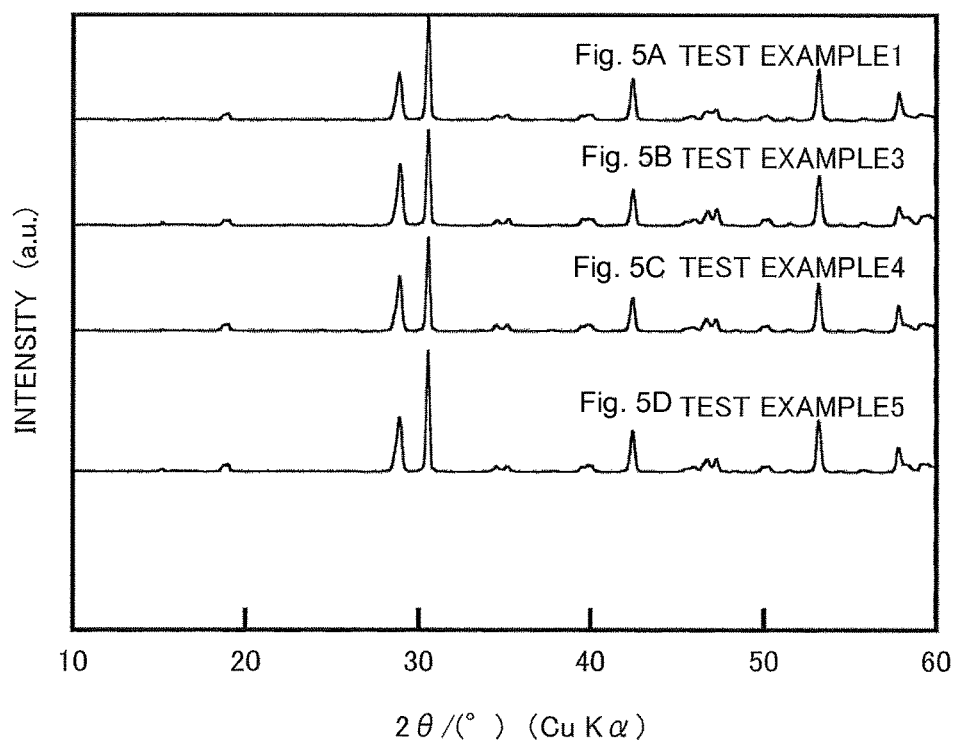
FIG. 5 is a diagram illustrating X-ray diffraction patterns of $BiVO_4$ layers formed in Test Examples 1, and 3 to 5.

An X-ray diffraction pattern of the $BiVO_4$ layer of Test Example 1 is illustrated in FIG. 5A, and an X-ray diffraction pattern of a $BiVO_4$ layer of Test Example 3 is illustrated in FIG. 5B.

Test Example 4

A laminate obtained in Test Example 1 was subjected to a sintering process at 400° C. for 1 hour. Following that, when an s-m phase coverage and a z-t phase coverage were obtained, similarly to Test Example 1, the s-m phase coverage was 90% and the z-t phase coverage was 1%.

The X-ray diffraction pattern of the $BiVO_4$ layer of Test Example 4 is illustrated in FIG. 5C.

Test Example 5

A laminate obtained in Test Example 1 was subjected to a sintering process at 450° C. for 1 hour. Following that, when an s-m phase coverage and a z-t phase coverage were obtained, similarly to Test Example 1, the s-m phase coverage was 90% and the z-t phase coverage was 1%.

An X-ray diffraction pattern of a $BiVO_4$ layer of Test Example 5 is illustrated in FIG. 5D.

Comparing the $BiVO_4$ layer of Test Example 1, and the $BiVO_4$ layers of Test Examples 3, 4, and 5 to which the sintering process was applied, ratios of the peak value of the diffraction line near $2\theta=31°$ and the peak value of the diffraction line near $2\theta=28°$ were nearly the same. Therefore, it was considered that there is no substantial difference in the orientation of the 010 plane of the $BiVO_4$ layer. However, when the sintering process was applied, splitting of a diffraction line belonging to a 200 plane and a 002 plane near $2\theta=35°$ became clear, and it was found that crystallinity becomes high.

Test Example 6

Figure 6:
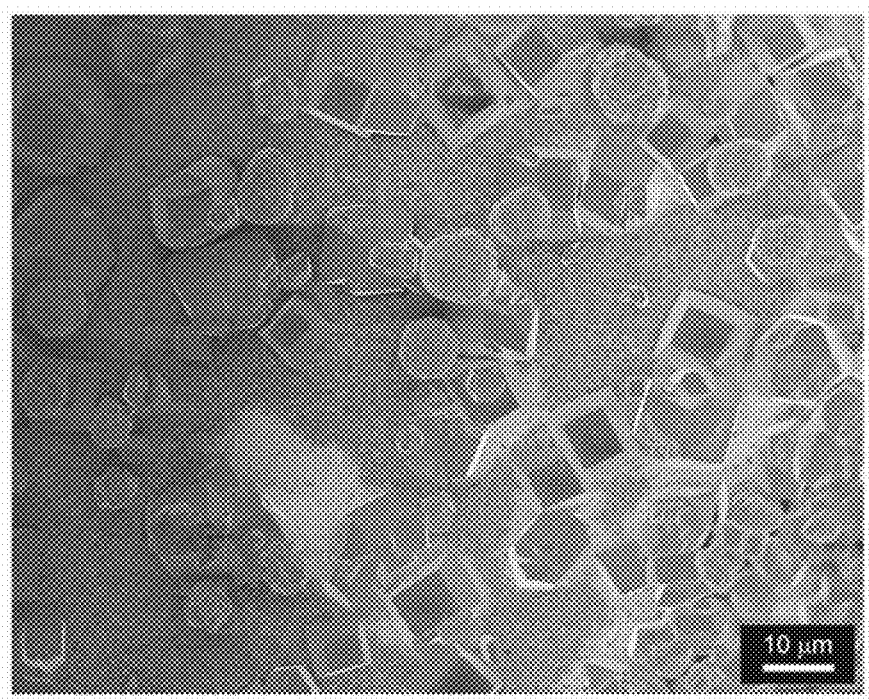
FIG. 6 is a diagram illustrating a SEM observation image of $BiVO_4$ layer formed in Test Example 6.

A laminate was obtained, similarly to Test Example 1, except that 1 g of urea was added to a precursor solution. A state of a $BiVO_4$ layer of the obtained laminate observed with a SEM is illustrated in FIG. 6. Similarly to the $BiVO_4$ layer obtained in Test Example 1, crystals of an s-m phase existed on crystals of a z-t phase. The crystals of the s-m phase existed having a square-like plane parallel to the substrate. However, the number of the crystals of the s-m phases was smaller than that of the $BiVO_4$ layer obtained in Test Example 1. When the s-m phase coverage and the z-t phase coverage were obtained, similarly to Test Example 1, the s-m phase coverage was 61% and the z-t phase coverage was 35%.

An X-ray diffraction pattern of the $BiVO_4$ layer of Test Example 6 is illustrated in FIG. 2D. Both a diffraction line characteristic of the s-m phase and a diffraction line characteristic of the z-t phase appeared, and it was confirmed that the $BiVO_4$ layer contains more z-t phases than the $BiVO_4$ layer of Test Example 1. It was found that a peak value of the diffraction line near $2\theta=31°$ of the s-m phase is higher than a peak value of the diffraction value near $2\theta=28°$, and the s-m phase has 010-plane orientation.

Test Example 7

A laminate obtained in Test Example 6 was subjected to the sintering process at 400° C. for 1 hour. Following that, when an s-m phase coverage and a z-t phase coverage were obtained, similarly to Test Example 1, the s-m phase coverage was 61% and the z-t phase coverage was 35%.

Test Example 8

A laminate was obtained, similarly to Test Example 1, except that 3 g of urea was added to a precursor solution. When a $BiVO_4$ layer of the obtained laminate was observed with a SEM, it was found that most of a surface is covered with the crystal of a z-t phase. When an s-m phase coverage and a z-t phase coverage were obtained, similarly to Test Example 1, the s-m phase coverage was 4% and the z-t phase coverage was 96%.

An X-ray diffraction pattern of the $BiVO_4$ layer of Test Example 8 is illustrated in FIG. 2E. It was confirmed that peak values of diffraction lines near $2\theta=32°$ and near $2\theta=49°$ characteristic of the z-t phase are large, and there are many z-t phases. Since the $BiVO_4$ layer of Test Example 8 had more z-t phases than the $BiVO_4$ layer of Test Example 6, it was found that the z-t phase can be easily formed if the amount of urea added to the precursor solution is large.

Test Example 9

Figure 7:
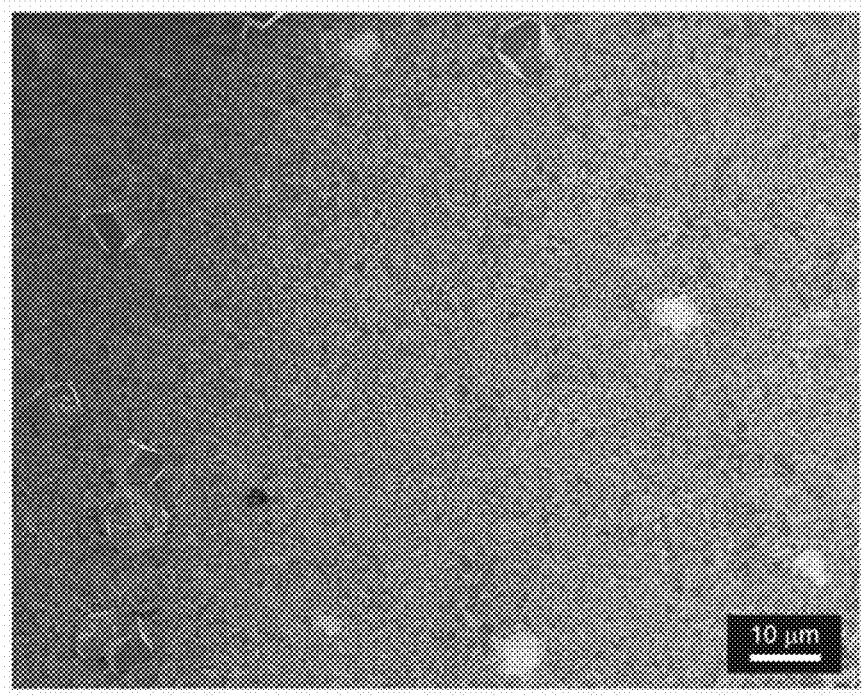
FIG. 7 is a diagram illustrating a SEM observation image of $BiVO_4$ layer formed in Test Example 9.

A laminate obtained in Test Example 8 was subjected to the sintering process at 400° C. for 1 hour. A state of a $BiVO_4$ layer of the obtained laminate observed with a SEM is illustrated in FIG. 7. It was found that most of a surface is covered with crystals of a z-t phase. When an s-m phase coverage and a z-t phase coverage were obtained, similarly to Test Example 1, the s-m phase coverage was 4% and the z-t phase coverage was 96%.

Test Example 10

Figure 8:
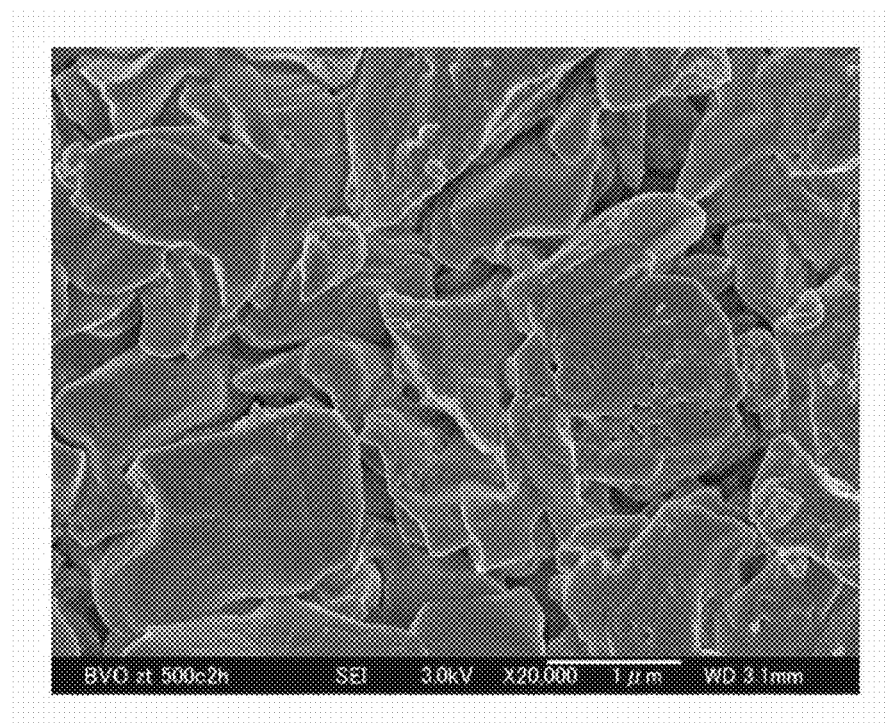
FIG. 8 is a diagram illustrating a SEM observation image of $BiVO_4$ layer formed in Test Example 10.

A laminate obtained in Test Example 9 was subjected to the sintering process at 500° C. for 2 hours. A state of a $BiVO_4$ layer of the obtained laminate observed with a SEM is illustrated in FIG. 8. It was found that a surface is covered with dense crystals of an s-m phase. When an s-m phase coverage and a z-t phase coverage were obtained, similarly to Test Example 1, the s-m phase coverage was 99% and the z-t phase coverage was 0%.

From this, it was found that a $BiVO_4$ layer formed in a precursor solution containing much urea, like Test Example 8, contains many z-t phases, and thus conversion from the z-t phase to the s-m phase is difficult if a sintering temperature is not made to be high or a sintering time is not made long.

Table 1 illustrates manufacturing conditions of the respective laminates. The s-m phase coverage and the z-t phase coverage of the respective laminates are also illustrated in Table 1.

a cutoff filter, and irradiation was performed. The irradiation of the $BiVO_4$ electrode with the light was performed from the glass substrate side.

First, in the three-electrode type generator, the $BiVO_4$ electrode as a positive electrode and the counter electrode as a negative electrode were electrically connected, and cyclic voltammetry measurement was performed at a sweep rate of 20 mV/second. During the sweeping, irradiation with light was intermittently performed, and a voltage was gradually increased and was then gradually decreased.

Figure 9:
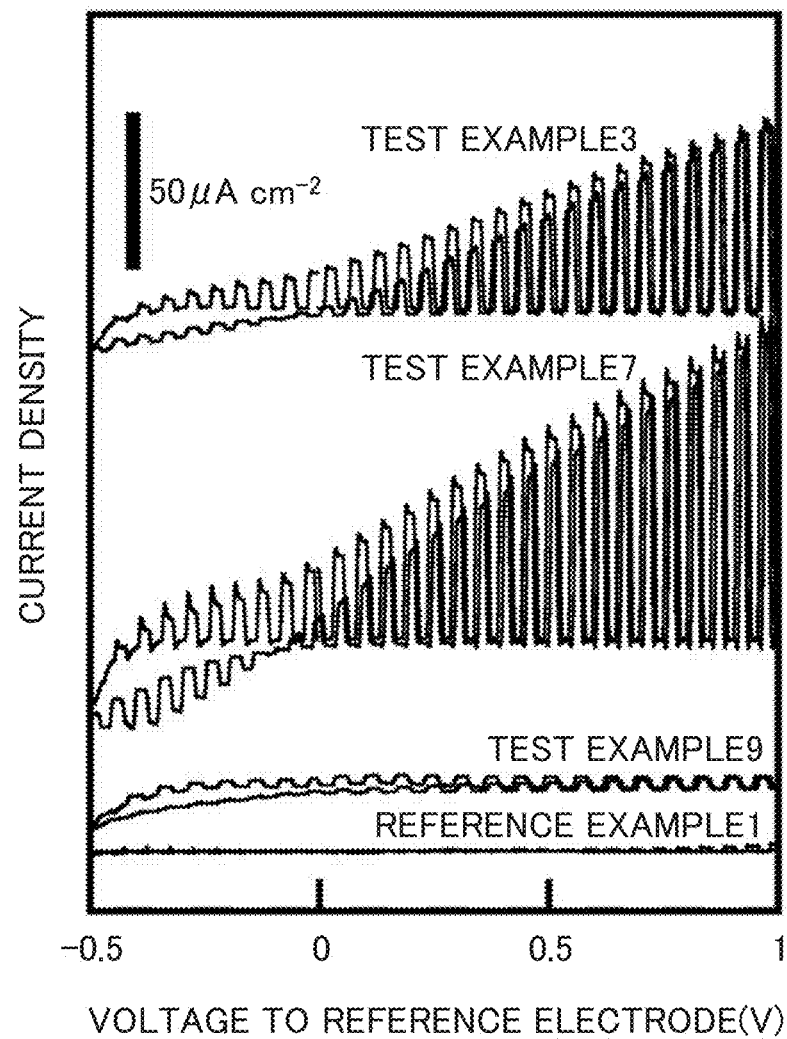
FIG. 9 is a diagram illustrating current-potential curves when irradiation with pseudo sunlight is performed using $BiVO_4$ electrodes produced from $BiVO_4$ laminates manufactured in Test Examples 3, 7, and 9, and Reference Example 1.
Figure 10:
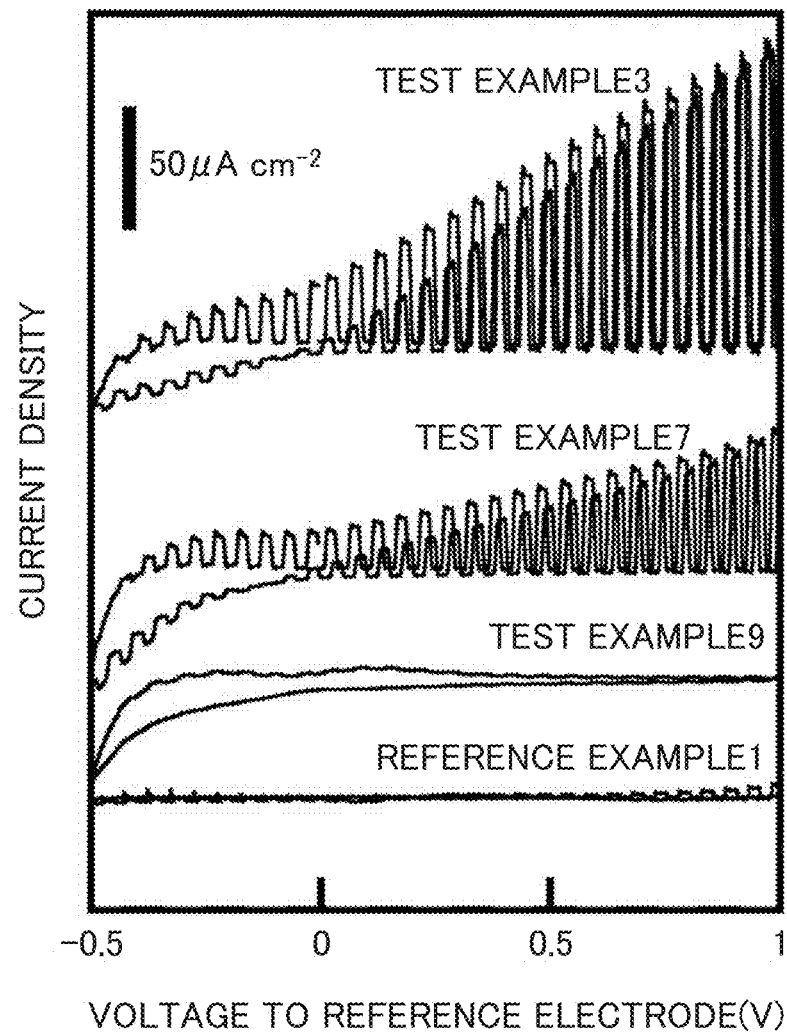
FIG. 10 is a diagram illustrating current-potential curves when irradiation with visible sunlight is performed using the $BiVO_4$ electrodes produced from the $BiVO_4$ laminates manufactured in Test Examples 3, 7, and 9, and Reference Example 1.

When the cyclic voltammetry measurement was performed with irradiation of pseudo sunlight using the $BiVO_4$ electrodes created from the laminate obtained in Test Examples 3, 7, and 9, and Reference Example 1, the current-potential curves as illustrated in FIG. 9 were obtained. Furthermore, when the cyclic voltammetry measurement was performed with irradiation with the visible light, the current-potential curves as illustrated in FIG. 10 were obtained.

TABLE 1

|  | MICROWAVE IRRADIATION | UREA ADDITION AMOUNT | FIRING TREATMENT | z-t COVERAGE | s-m COVERAGE |
|---|---|---|---|---|---|
| Test Example 1 | 300 W, 10 MINUTES | — | — | 1% | 90% |
| Test Example 2 | 300 W, 30 MINUTES | — | — | 0% | 93% |
| Test Example 3 | 300 W, 10 MINUTES | — | 350° C., 1 h | 1% | 90% |
| Test Example 4 | 300 W, 10 MINUTES | — | 400° C., 1 h | 1% | 90% |
| Test Example 5 | 300 W, 10 MINUTES | — | 450° C., 1 h | 1% | 90% |
| Test Example 6 | 300 W, 10 MINUTES | 1 g | — | 35% | 61% |
| Test Example 7 | 300 W, 10 MINUTES | 1 g | 400° C., 1 h | 35% | 61% |
| Test Example 8 | 300 W, 10 MINUTES | 3 g | — | 96% | 4% |
| Test Example 9 | 300 W, 10 MINUTES | 3 g | 400° C., 1 h | 96% | 4% |
| Test Example 10 | 300 W, 10 MINUTES | 3 g | 400° C., 1 h + 500° C., 2 h | 0% | 99% |
| Reference Example 1 | 500 W, 60 MINUTES | 3 g | 400° C., 1 h | — | — |

[Evaluation 1 as Photoelectrode]

Regarding the laminates obtained in Test Examples 1 to 10 and Reference Example 1, a part of the $BiVO_4$ layers of the laminates was scraped off and the FTOs were exposed. A copper wire was glued thereto with silver paste, and FTO exposed portions were covered with Araldite, so that $BiVO_4$ electrodes were created. All of the $BiVO_4$ layers obtained in Test Examples 1 to 10 had favorable adhesiveness with the substrate.

Evaluation of the photoelectrodes was performed with a three-electrode type or two-electrode type hydrogen and oxygen generator. 0.025 mol/l of a phosphate buffer solution ($KH_2PO_4$/$Na_2HPO_4$, pH=7) as an electrolytic solution was injected into an H-type cell, which is partitioned into a cathode section and an anode section, with a Nafion (registered trademark), ion-exchange membrane, and the H-type cell was deaerated with an argon gas before measurement. In the two-electrode type generator, the $BiVO_4$ electrode was placed in the anode section, and a counter electrode made of platinum black was placed in the cathode section. In the three-electrode type generator, a saturated Ag/AgCl electrode was further placed in the anode section in which the $BiVO_4$ electrode was placed, as a reference electrode. A potentiostat HZ-5000 (manufactured by Hokuto Denko Corp.) was connected to these electrodes.

A solar simulator PEC-L11 (100 mW/cm$^2$, manufactured by Peccell Technologies, Inc.) was used as the light source, and irradiation with pseudo sunlight was performed. When irradiation with visible light was performed, light in a wavelength length range of 420 nm or less was cut off using A high response current was obtained in the $BiVO_4$ electrode created from the laminate of Test Example 3, in the both cases of irradiation with the pseudo sunlight and the visible light. The laminate of Test Example 3 has a structure in which a small amount of the z-t phases of $BiVO_4$ exists on the FTO layer on the glass substrate, and the thick s-m phase having high 010-plane orientation exists thereon. From this, it has been found that the $BiVO_4$ layer of the s-m phase having high 010-plane orientation does a remarkable job as a photoelectrode film.

A high response current was also obtained in the $BiVO_4$ electrode created from the laminate of Test Example 7. However, the photoresponsivity when the irradiation with visible sunlight was performed was inferior to the case of irradiation of the pseudo sunlight. The laminate of Test Example 7 has a structure in which the $BiVO_4$ layer of the z-t phase exists on the FTO layer on the glass substrate, and the $BiVO_4$ crystals of the s-m phase are further scattered thereon. Therefore, when irradiation with the visible light was performed from the glass substrate side, the light was blocked by the z-t phase without having absorption of the visible light, the light amount reaching the crystals of the s-m phase was decreased, and the response current was decreased.

Meanwhile, the $BiVO_4$ electrode created from the laminate of Test Example 9, which has the $BiVO_4$ layer mostly covered with the z-t phase was substantially inferior in the photoresponsivity. From this it was found that the $BiVO_4$ layer usable as the photoelectrode film is the s-m phase.

However, the $BiVO_4$ electrode of Reference Example 1 created with coated $BiVO_4$ powder did not have photoresponsivity even through having the s-m phase. Therefore, it was found that the s-m phase directly formed on the substrate, which is obtained by the method of the present invention, is effective as the photoelectrode film.

Figure 11:
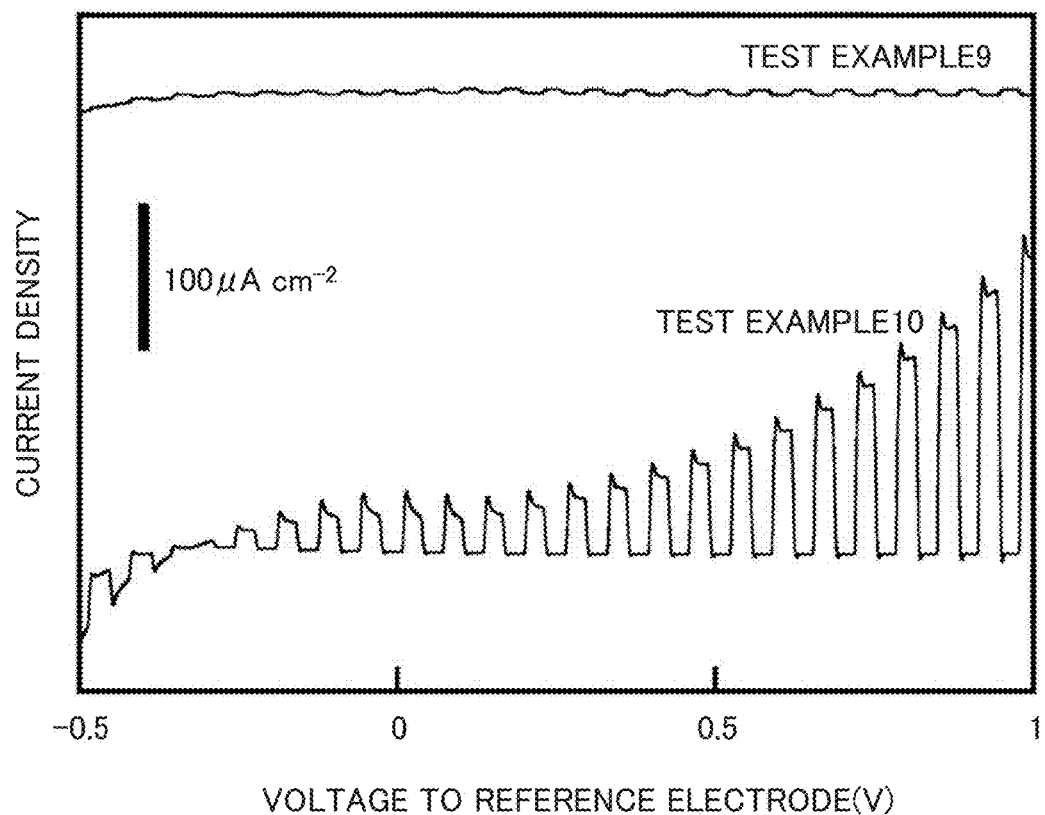
FIG. 11 is a diagram illustrating current-potential curves when irradiation with pseudo sunlight is performed using $BiVO_4$ electrodes produced from $BiVO_4$ laminates manufactured in Test Examples 9 and 10.

FIG. 11 illustrates current-voltage curves when the cyclic voltammetry measurement was performed with irradiation with the pseudo sunlight, using the $BiVO_4$ electrodes created from the laminates obtained in Test Examples 9 and 10. The laminate of Test Example 10 includes the $BiVO_4$ layer converted from the z-t phase to the s-m phase by the sintering process. It was confirmed that the $BiVO_4$ electrode created from the laminate of Test Example 10, which has the s-m phase, has high photoresponsivity, and the s-m phase directly formed on the substrate is effective as the photoelectrode film.

Figure 12:
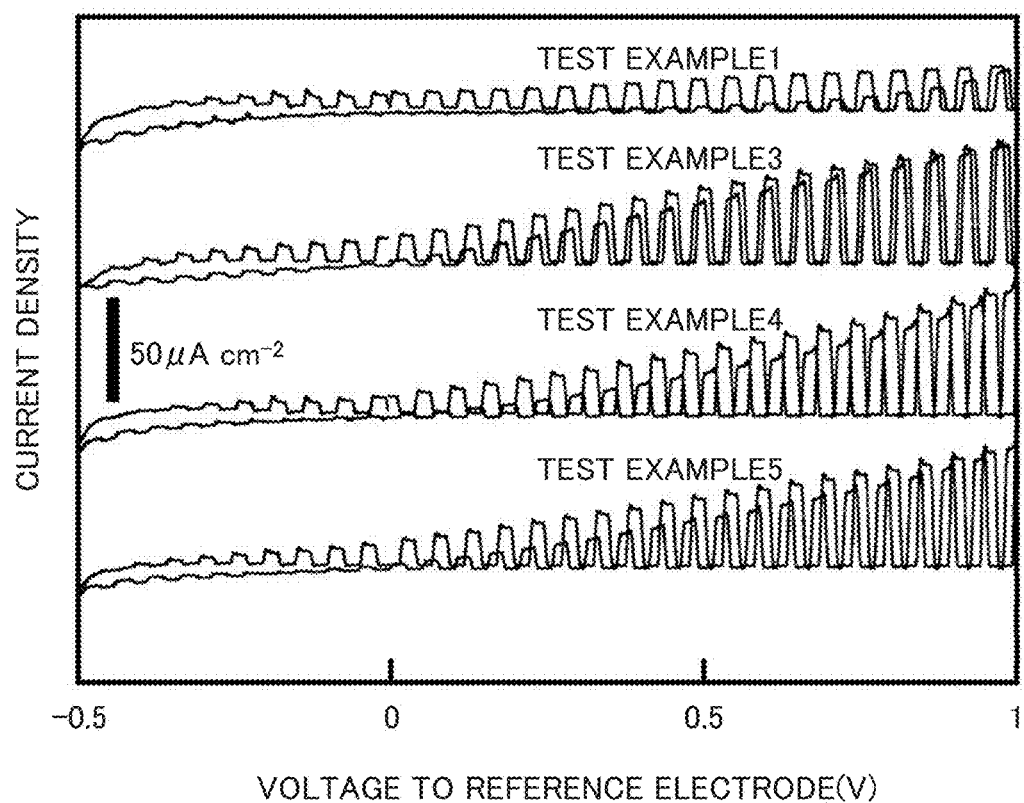
FIG. 12 is a diagram illustrating current-potential curves when irradiation with pseudo sunlight is performed using $BiVO_4$ electrodes produced from $BiVO_4$ laminates manufactured in Test Examples 1, and 3 to 5.

FIG. 12 illustrates the current-voltage curves when irradiation with the pseudo sunlight was performed, using the $BiVO_4$ electrode created from the laminates obtained in Test Examples 1, and 3 to 5. The $BiVO_4$ electrodes created from the laminates of Test Examples 3 to 5, to which the sintering process was applied at the time of manufacturing the laminates, had a larger response current than the case of the $BiVO_4$ electrode created from the laminate of Test Example 1, to which no sintering process was applied. Since most of the surface of the $BiVO_4$ layer of Test Example 1 was covered with the s-m phase, there was no substantial difference in the response current value, even if a sintering condition was changed in Test Examples 3 to 5.

Figure 13:
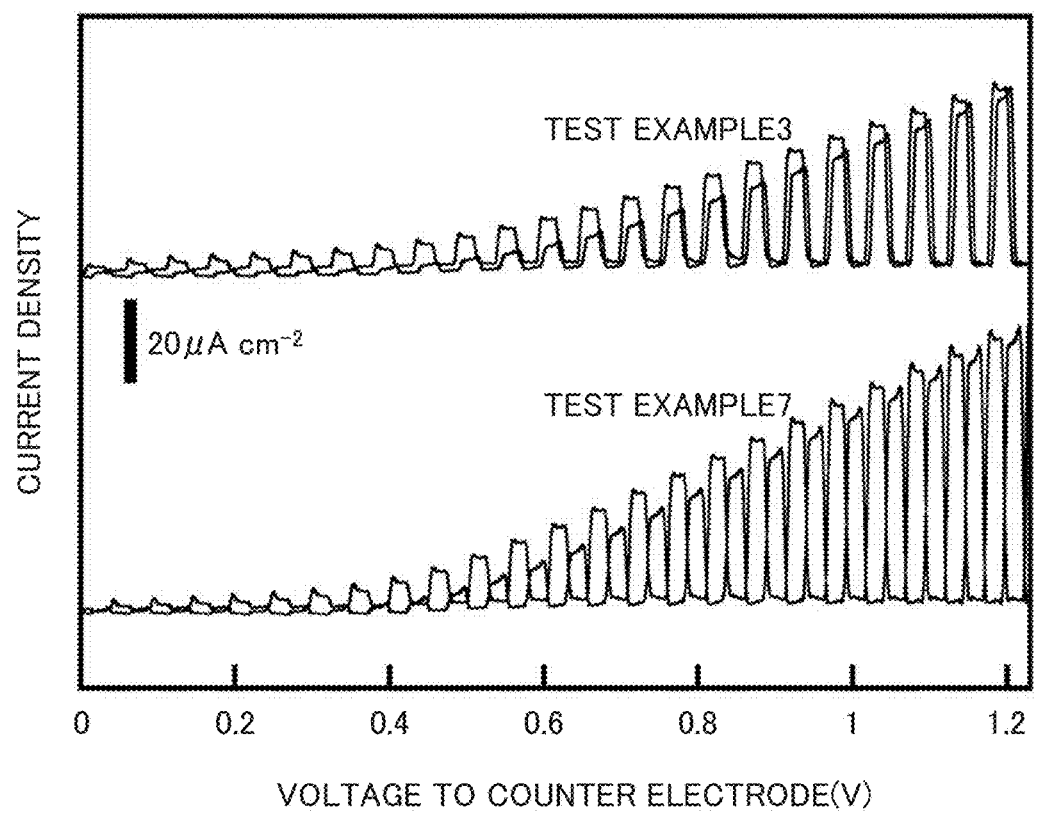
FIG. 13 is a diagram illustrating current-potential curves when irradiation with pseudo sunlight is performed using $BiVO_4$ electrodes produced from $BiVO_4$ laminates manufactured in Test Examples 3 and 7.

Next, in the two-electrode type generator, $BiVO_4$ electrodes created from the laminates obtained in Test Examples 3 and 7 as positive electrodes and counter electrodes as negative electrodes were electrically connected, and cyclic voltammetry measurement was performed at a sweep rate of 20 mV/second. During the sweeping, irradiation of the pseudo sunlight was intermittently performed, and a voltage was gradually increased and was then gradually decreased. Results are illustrated in FIG. 13. It was confirmed that a photocurrent derived from the photoelectrolysis of water is observed, even if a voltage smaller than 1.23 V, which is a theoretical decomposition voltage of water, is applied to the counter electrodes, and these $BiVO_4$ electrodes are effective for optical energy conversion.

Test Example 11

Figure 14:
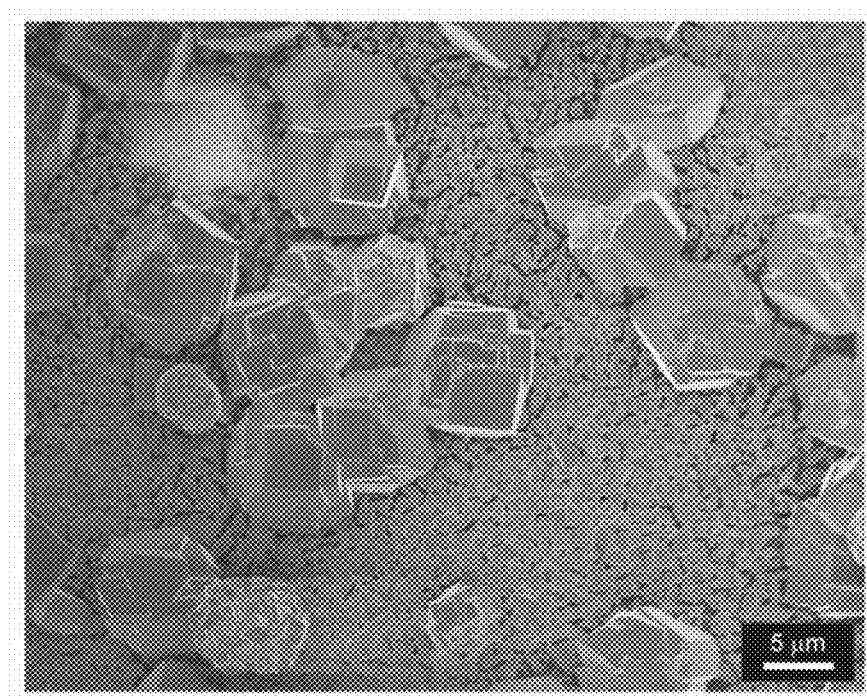
FIG. 14 is a diagram illustrating a SEM observation image of $BiVO_4$ layer formed in Test Example 11.

A laminate was obtained, similarly to Test Example 1, except that irradiation with microwaves was performed at 300 W for 3 minutes, and then the obtained laminate was subjected to a sintering process at 300° C. for 1 hour. A result of observation of the obtained laminate with a SEM is illustrated in FIG. 14. There were crystals of a z-t phase of $BiVO_4$ on an FTO layer, and crystals of an s-m phase existed thereon. When an s-m phase coverage and a z-t phase coverage were obtained, similarly to Test Example 1, the s-m phase coverage was 54% and the z-t phase coverage was 44%.

Figure 15:
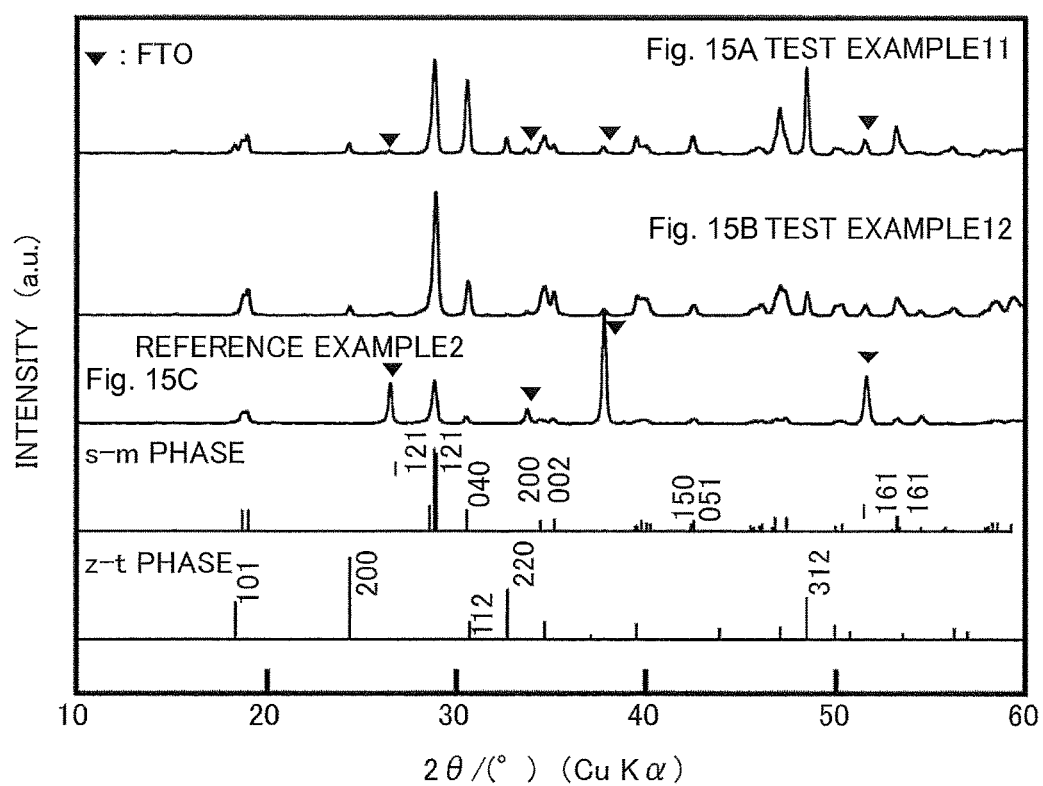
FIG. 15 is a diagram illustrating X-ray diffraction patterns of $BiVO_4$ layers formed in Test Examples 11 and 12, and Reference Example 2.

An X-ray diffraction pattern of the $BiVO_4$ layer of Test Example 11 is illustrated in FIG. 15A. It was confirmed that both the diffraction line characteristic of the s-m phase and the diffraction line characteristic of the z-t phase appear.

Test Example 12

A first $BiVO_4$ layer was laminated on an FTO glass substrate, similarly to Test Example 1, except that irradiation with microwaves was performed at 300 W for 1 minutes. Note that a crystal phase of the first $BiVO_4$ layer was a z-t phase.

Meanwhile, a precursor coating solution, which is a nitric acid (3 mol/l) aqueous solution containing 0.2 mol/l of $NH_4VO_3$ and 0.2 mol/l of $Bi(NO_3)_3$, was prepared. 3 µl/cm² of this precursor coating solution was dropped on an FTO glass substrate where the first $BiVO_4$ layer was formed, then the substrate was dried at a room temperature, and the coated layer was formed. Following that, when the substrate was sintered at 400° C. for 1 hour, the laminate having a second $BiVO_4$ layer laminated on the first $BiVO_4$ layer was obtained.

Figure 16:
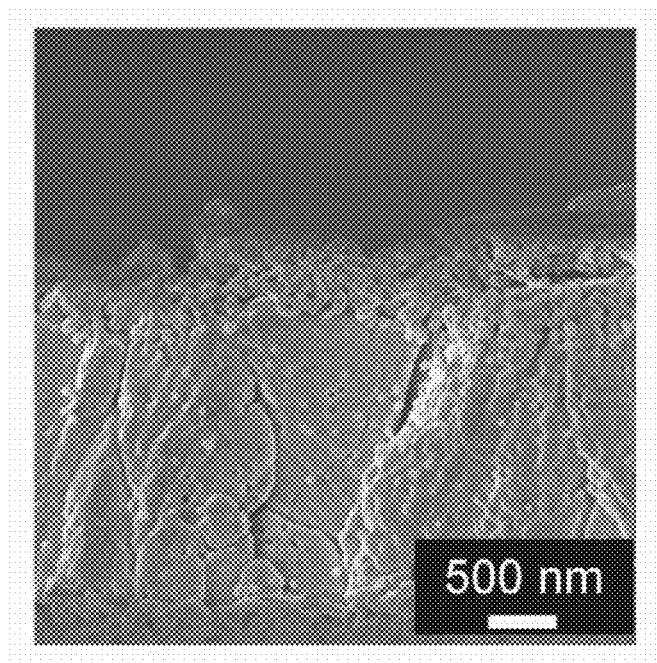
FIG. 16 is a diagram illustrating a SEM observation image of $BiVO_4$ layer formed in Test Example 12.

A result of observation of the cross section of the obtained laminate with the SEM is illustrated in FIG. 16. There was the crystal of the z-t phase on the FTO layer, which configures the first $BiVO_4$ layer, and the dense crystal of the s-m phase, which configures the second $BiVO_4$ layer existed thereon. When an s-m phase coverage and a z-t phase coverage were obtained, similarly to Test Example 1, the s-m phase coverage was 100% and the z-t phase coverage was 0%.

An X-ray diffraction pattern of the $BiVO_4$ layer of Test Example 12 is illustrated in FIG. 15B. It was confirmed that both the diffraction line characteristic of the s-m phase and the diffraction line characteristic of the z-t phase appear.

Reference Example 2

Figure 17:
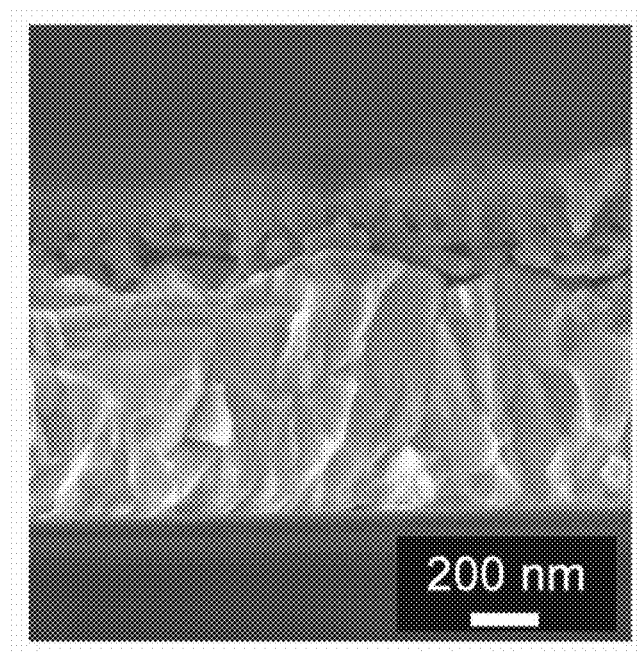
FIG. 17 is a diagram illustrating a SEM observation image of $BiVO_4$ layer formed in Reference Example 2.

A laminate was obtained, similarly to Test Example 12, except that a first $BiVO_4$ layer is not formed. A result of observation of a cross section of the obtained laminate with a SEM is illustrated in FIG. 17. Dense crystals of an s-m phase of $BiVO_4$ existed on an FTO layer. When an s-m phase coverage and a z-t phase coverage were obtained, similarly to Test Example 1, the s-m phase coverage was 100% and the z-t phase coverage was 0%.

An X-ray diffraction pattern of the $BiVO_4$ layer of Reference Example 2 is illustrated in FIG. 15C. Although a diffraction line characteristic of the s-m phase was confirmed, a diffraction line characteristic of the z-t phase was not confirmed.

[Evaluation 2 as Photoelectrode]

$BiVO_4$ electrodes were created, similarly to [Evaluation 1 as Photoelectrode], regarding the laminates obtained in Test Examples 11 and 12, and Reference example 2. Then, in a three-electrode generator, the $BiVO_4$ electrodes as positive electrodes and counter electrodes as negative electrodes were electrically connected, and cyclic voltammetry measurement was performed at a sweep rate of 20 mV/second. During the sweeping, irradiation of light was intermittently performed, and a voltage was gradually decreased.

Figure 18:
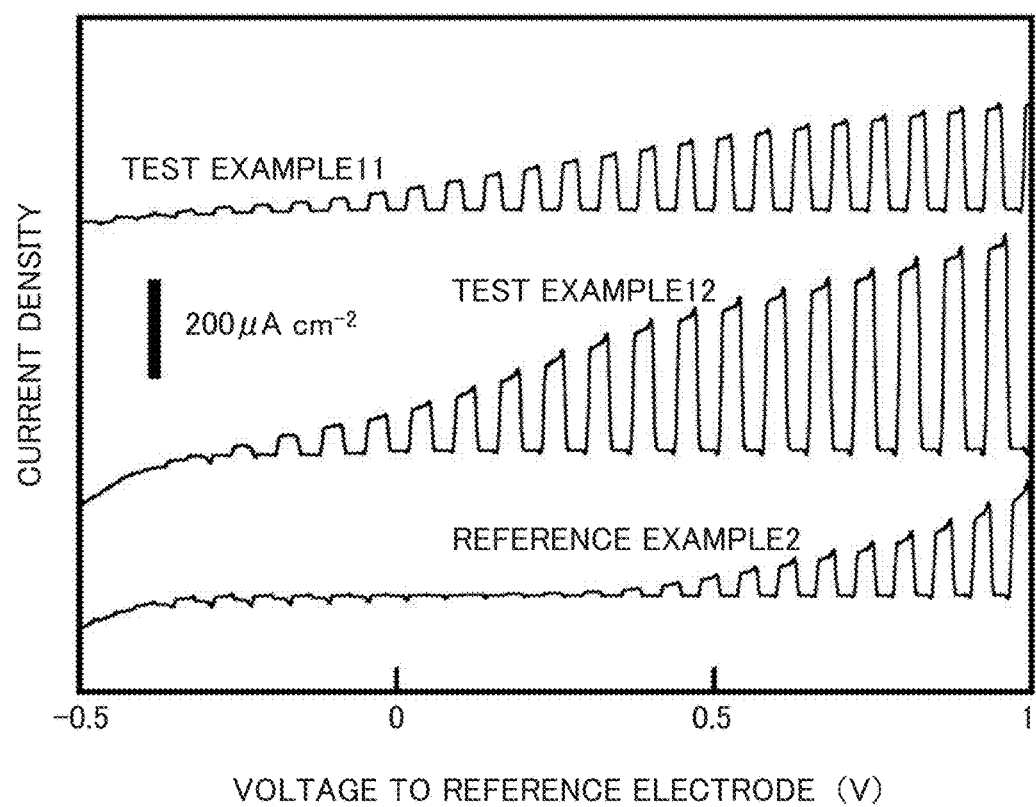
FIG. 18 is a diagram illustrating current-potential curves when irradiation with pseudo sunlight is performed using $BiVO_4$ electrodes produced from $BiVO_4$ laminates manufactured in Test Examples 11 and 12, and Reference Example 2.

When the cyclic voltammetry measurement was performed with irradiation of the pseudo sunlight, using the $BiVO_4$ electrodes created from the laminates obtained in Test Examples 11 and 12, and Reference Example 2, the current-potential curves as illustrated in FIG. 18 were obtained.

While both the laminates of Test Examples 11 and 12 included the z-t phase and the s-m phase, the $BiVO_4$ electrode produced from the laminate of Test Example 12 exhibited higher photoresponsivity. This is because, while the laminate of Test Example 11 has a structure in which the z-t phase $BiVO_4$ layer exists on the FTO layer, and the s-m phase $BiVO_4$ crystal is further scattered thereon, the laminate of Test Example 12 has a structure in which the z-t phase $BiVO_4$ layer exists on the FTO layer, and the dense s-m phase $BiVO_4$ layer exists thereon.

Although the laminate of Reference Example 2 had the dense s-m phase $BiVO_4$ layer formed on the FTO layer, the response current was decreased compared with Test Examples 11 and 12. From this result, it was found that it is important to include the step of forming the $BiVO_4$ layer on the substrate by the microwave-activated chemical bath deposition.

The invention claimed is:

1. A manufacturing method for forming two bismuth-vanadate layers on a substrate, the method comprising:
    arranging the substrate in a precursor solution containing a vanadium salt and a bismuth salt,
    heating the substrate arranged in the precursor solution by irradiating with microwave radiation thereby forming a first bismuth-vanadate layer on the substrate, and
    forming a second bismuth-vanadate layer on the first bismuth-vanadate layer by coating and sintering the precursor solution on the first bismuth-vanadate layer,
    wherein ratios of a zircon-structure tetragonal phase and a scheelite-structure monoclinic phase in a crystal phase of the first bismuth-vanadate layer are controlled by controlling at least one of (a) a sintering temperature and (b) a sintering time in the sintering.

2. The manufacturing method according to claim 1, wherein
    the crystal phase of the first bismuth-vanadate layer is a zircon-structure tetragonal phase, and a crystal phase of the second bismuth-vanadate layer is a scheelite-structure monoclinic phase.

3. The manufacturing method according to claim 1, wherein irradiation power of the microwave radiation is from 100 to 500 W.

4. The manufacturing method according to claim 3, wherein irradiation time of the microwave radiation is from 1 to 30 minutes.

5. The manufacturing method according to claim 1, wherein the sintering is performed at a temperature of 100 to 550° C. for a duration of 0.5 to 5 hours.

6. The manufacturing method according to claim 1, wherein the substrate is a glass or a resin substrate including a conductive film.

7. The manufacturing method according to claim 6, wherein the conductive film is selected from the group consisting of tin-doped indium oxide (ITO), zinc-doped indium oxide (IZO), fluorine-doped in tin-oxide (FTO), and aluminum-doped zinc oxide (AZO).

\* \* \* \* \*